United States Patent

[11] 3,604,083

| [72] | Inventors | Bruno Antonietto;<br>Elio Pagella, both of Torino, Italy |
|---|---|---|
| [21] | Appl. No. | 748,534 |
| [22] | Filed | July 29, 1968 |
| [45] | Patented | Sept. 14, 1971 |
| [73] | Assignee | Ing. C. Olivetti & C., S.p.A.<br>Ivrea (Torino), Italy |
| [32] | Priority | June 29, 1967 |
| [33] | | Italy |
| [31] | | 52600 A/67 |

[54] TOOL CHANGE DEVICE FOR A MACHINE TOOL
2 Claims, 6 Drawing Figs.

[52] U.S. Cl. ............................................. 29/26,
29/40, 29/41, 29/568, 90/11 A
[51] Int. Cl. ............................................. B23b 29/32,
B23c 5/26, B23q 3/157
[50] Field of Search ............................................. 29/39, 26,
568, 40, 41; 77/25, 3; 90/11.1, 14

[56] References Cited
UNITED STATES PATENTS

| 2,749,806 | 6/1956 | Stephan | 90/11.1 X |
| 3,074,147 | 1/1963 | Miller et al. | 77/25 X |
| 3,406,607 | 10/1968 | Hill | 77/25 X |
| 3,422,724 | 1/1969 | Zankl et al. | 77/25 X |

FOREIGN PATENTS

| 1,491,020 | 6/1967 | France | 77/25 |

*Primary Examiner*—Gil Weidenfeld
*Attorney*—Birch, Swindler, McKie and Beckett

ABSTRACT: A machine tool with a device for effecting rapid tool changes comprising a frame carrying a rotatable spindle capable of being coupled to a tool through the intermediary of a toolholder to which the tool is secured. A mechanism for lining up the spindle, from whatever position it is in, to a predetermined angular setting in order to allow engagement of the toolholder with the spindle, and translational locking devices inside the spindle operative to provide a coupling to the toolholder to operate the spindle after the tool has been connected thereto, are provided.

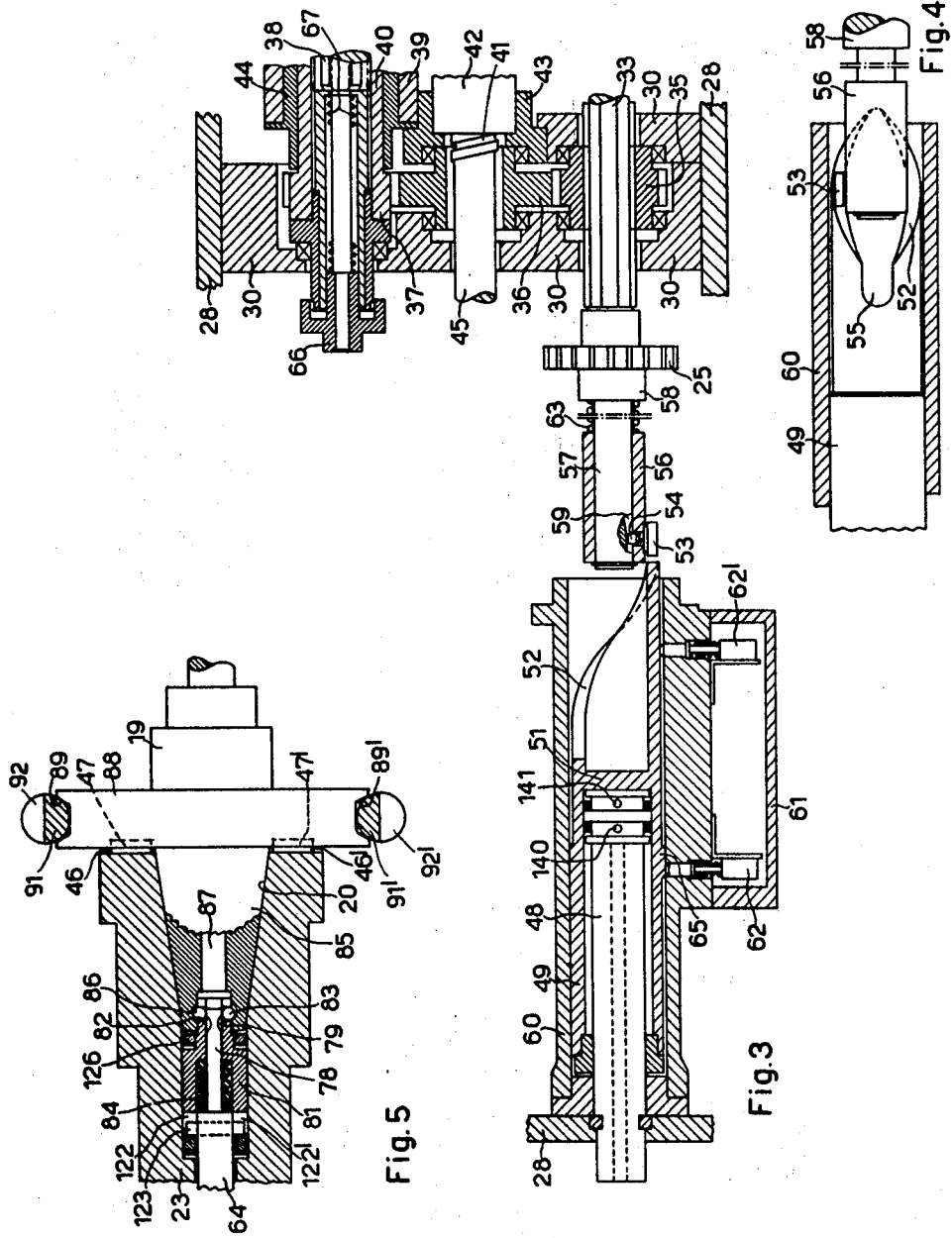

TOOL CHANGE DEVICE FOR A MACHINE TOOL

CROSS REFERENCE TO RELATED APPLICATION

Applicants claim priority from corresponding Italian patent application Ser. No. 52600–A/67, filed July 29, 1967.

BACKGROUND OF THE INVENTION

1. Field of the Invention

The invention relates to a machine tool for effecting rapid tool changes according to a predetermined sequence between a plurality of different tools. In particular, means are disclosed to prevent damage to the spindle driving the selected tool during connection therebetween.

2. Description of the Prior Art

The prior art discloses machine tools wherein a plurality of tools may be selectively positioned and connected according to a predetermined sequence to driving means in order to work a piece of material. However, in most machine tools having tool change devices, the tool is secured to the spindle driving it while the latter is revolving. These machines have the disadvantage that the spindle fittings may be damaged when engaging and securing the toolholder when the latter is in rest position.

SUMMARY OF THE INVENTION

This and other defects of prior art machine tools having tool change devices is solved by the present invention. The machine tool disclosed herein has a device for effecting rapid tool changes comprising a frame carrying a rotatable spindle capable of being connected to a tool through the intermediary of a toolholder to which the tool is secured, and driving means for operating the said spindle after the tool has been connected. A mechanism for lining up the spindle, from whatever position it is in, to a predetermined angular setting in order to allow engagement of the spindle without damage to the latter, and translational locking device inside the spindle operative to provide a coupling to the toolholder to effect the aforesaid connection, are provided.

BRIEF DESCRIPTION OF THE DRAWINGS

FIG. 3 is another part sectional view of the machine of FIG. 1;

FIG. 4 is a sectional view of a detail of FIG. 3 in the operating position;

FIG. 5 is a large-scale sectional view of a detail of FIG. 2,

DETAILED DESCRIPTION OF THE INVENTION

Figure 1:
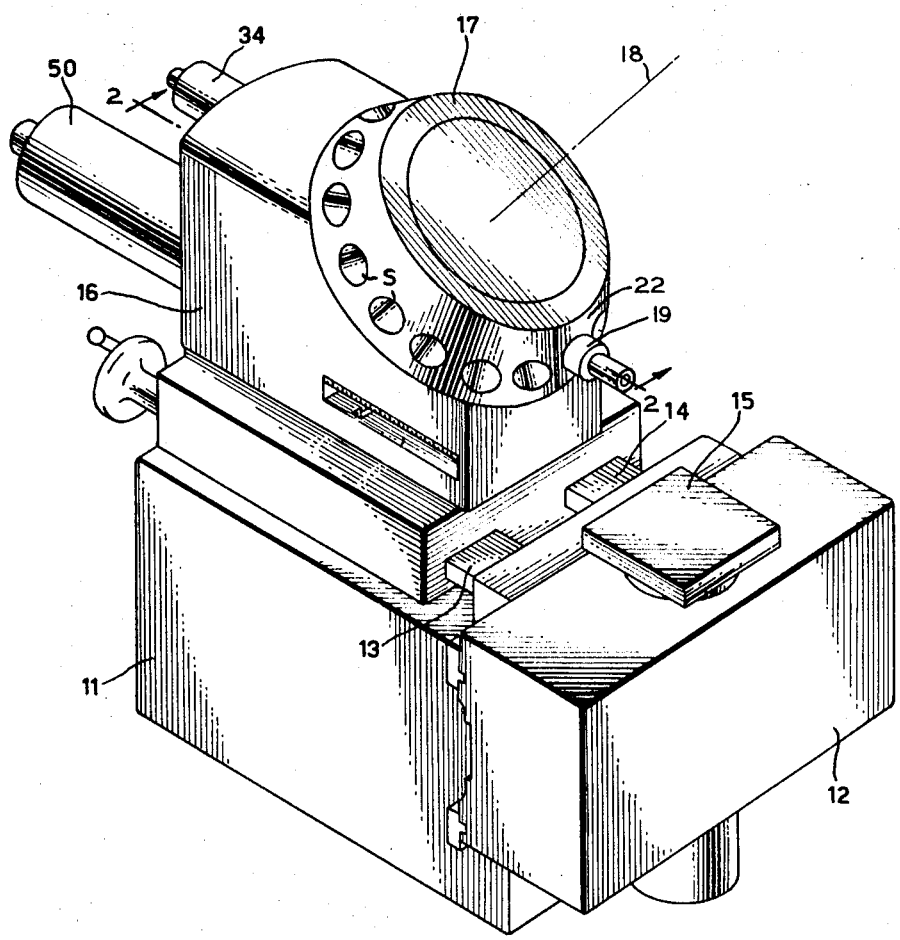
FIG. 1 is a left front perspective view of a machine tool fitted with a rapid tool change device according to the invention.

Referring to FIG. 1, the machine comprises base 11 mounted on carriage 12 which is movable in the transverse direction, and workpiece table 15 which is rotatable and vertically adjustable. The movements of carriage 12 and table 15 may be controlled by a conventional control system having a program recorded on punched or magnetic tape, for example.

Figure 2:
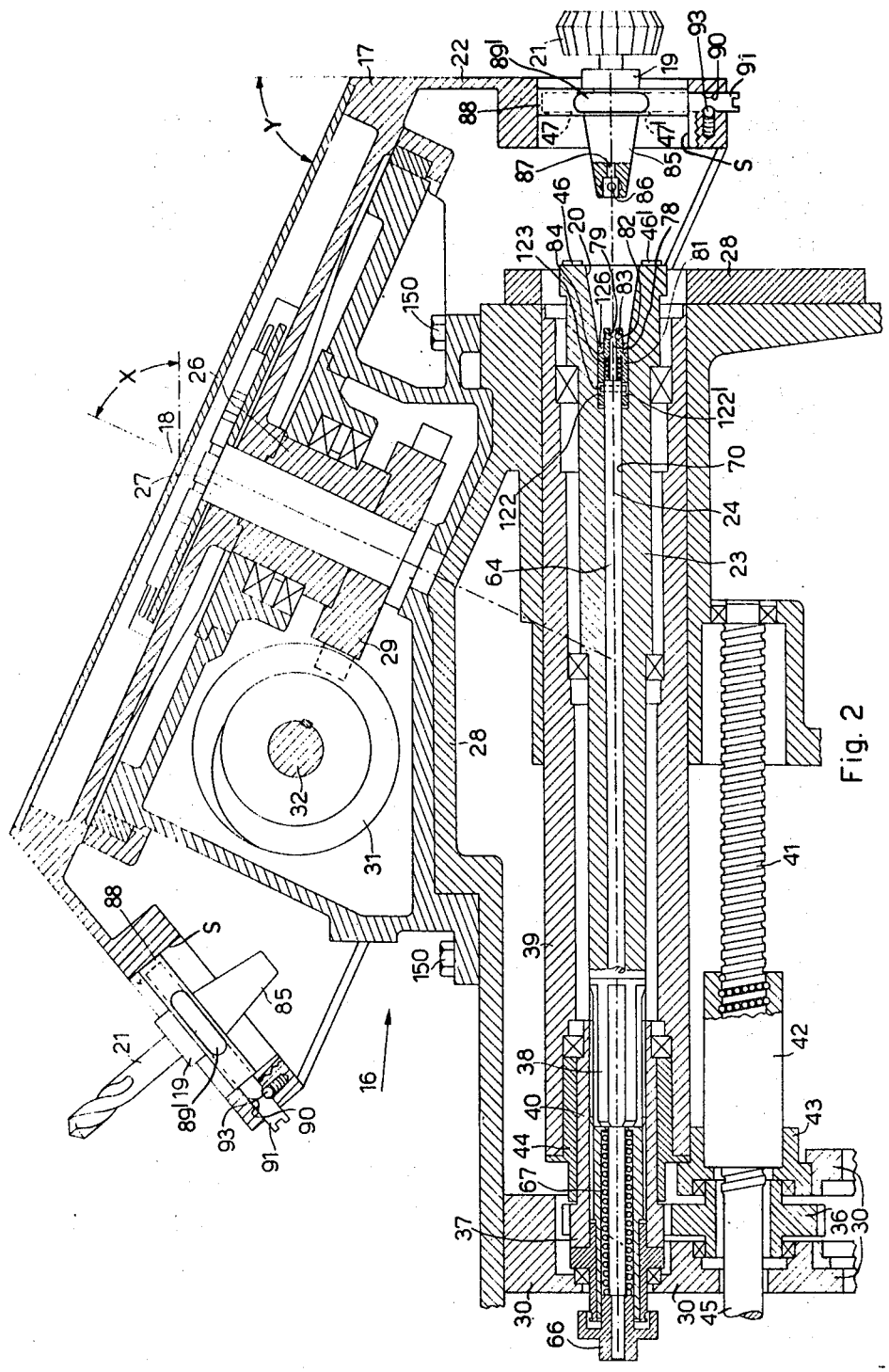
FIG. 2 is a part sectional view of the machine of FIG. 1.

Prismatic guides 13 and 14 upon which headstock 16 is free to run are affixed to base 11. Headstock 16 carries a tool magazine secured thereto by screws 150 (FIG. 2). The tool magazine comprises truncated cone-shaped drum 17 which is revolvable about its axis 18. Drum 17 defines a plurality of seats S to hold a series of tool carriers 19, each of which carries a particular associated tool 21 projecting radially from lateral surface 22 of the drum.

As shown in FIG. 2, headstock also comprises horizontal spindle 23 rotatable about its longitudinal axis 24. Axis 18 of drum 17 is inclined towards axis 24 of spindle 23 at an angle X which is equal to the angle Y formed by the generatrix of the truncated cone-shaped drum 17 with either of its bases. Therefore when the drum turns, it aligns the various tools with the axis of spindle 23, according to a predetermined sequence determined by the selected program.

Drum 17 is integral with sleeve 26, the latter being rotatable on shaft 27 which is fixed to frame 28 of headstock 16. Drum 17 is therefore rotatable about frame 28. Sleeve 26 is also integral with worm wheel 29 that engages with worm 31 mounted by rotatable shaft 32 on frame 28. The gear ratio between worm 31 and wheel 29 is such that for each revolution of shaft 32, wheel 29 causes drum 17 to turn an amount equal to the angular distance between two adjacent tools. As best shown in FIG. 1, the tool seats "S" are equal angularly spaced about the drum 17. Accordingly, the gear ratio between worm 31 and wheel 29 is determined by the number of tool seats, for example, if there are 12 tool seats, one revolution of worm 31 must result in one-twelfth a revolution of drum 17, the ratio would then be 12 to 1 in the example chosen the drum thereby advances by one tool interval for each revolution of shaft 32. Rotation of shaft 32 for the purpose of tool selection is effected in the manner described in U.S. Pat. application No. 3,473,419.

The control mechanism for rotation of spindle 23 comprises a splined shaft 33 (FIG. 3) engaged by gear wheel 25. The latter is actuated through a conventional change speed gear (not shown) by electric motor 34 mounted on headstock 16. Interposed between shaft 33 and spindle 23 is a train of gears 35, 36, 37, show in FIG. 2 and 3. Gear 35 is internally splined and slidable on shaft 33, and gears 37 has an internally splined cylindrical extension 40 which engages splined portion 38 of spindle 23. Gears 35 and 36 are journaled in support 30 which is suitably guided on frame 28 for displacement parallel to shaft 33. Spindle 23 is rotatably mounted by means of bearings in slide 39 which is mounted on support 30 in a manner to enable the support 30 to move the slide 39 bodily in both directions, the structure for enabling the support 30 to move the slide rearwardly not being visible in FIG. 2.

The control transmission for the advancement and return of slide 39 comprises screw 41 and recirculating ball nut 42, operative through collar 43 and sleeve 44 on slide 39. Screw 41 is operated through shaft 45 by motor 50 (FIG. 1) mounted on headstock 16. Gear 36 is journaled loose on shaft 45. Cylindrical extension 40 of gear 37 is rotatably received within sleeve 44.

As shown in FIG. 5, the front end of spindle 23 has radial keys 46 and 46' that fit into corresponding slots 47 and 47', respectively, which are provided on each toolholder 19 for the purpose of coupling the latter to spindle 23. To insure accurate and reliable keying of the radial keys into their corresponding slots, a positioning unit comprising a double-acting pressure fluid actuator is operatively associated with spindle 23. The actuator as shown in FIG. 3 comprises piston 48 which is integral with frame 28 and ducts 140 and 141 for the flow of the pressure fluid. A slidable cylinder 49 which is prolonged beyond its cylinder head 51 to form a V-shaped double helical cam 52 (FIG. 4) is fitted onto piston 48. Cam-follower roller 53 is mounted on radial pin 54 which is fixed in sleeve 56. The latter is slidably mounted on shaft 57 which is coaxial, aligned with piston 48, and affixed to splined shaft 33. Pin 54 passes through the wall of sleeve 56 and engages shaft 57 within helical slot 59. Cylinder 49 is inserted within hollow shell 60. Box 61 integral with piston 48 and containing limit switches 62 and 62' which coact with shoulder 65 of cylinder 49 for the purpose of limiting the travel of said cylinder is secured to the side of hollow shell 60. Compression spring 63 is mounted on shaft 57 between sleeve 56 and terminal shoulder 58 of shaft 33.

Figure 6:
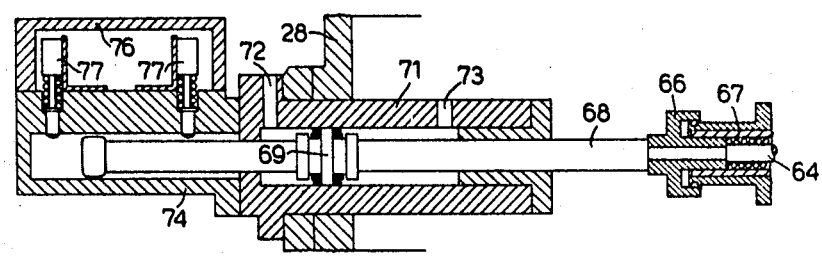
FIG. 6 is a sectional view of a detail of the machine tool.

Referring to FIG. 2, spindle 23 defines axial bore 70. Stem 64 is movable therein and comprises integral collar 66 at its rear end. A fluid dynamic piston, known conventionally in the art and shown in FIG. 6 is slideable in hydraulic cylinder 71 which is integral with housing 28, and has ports 72 and 73 for the admittance and release of fluid. It is provided with piston rod 68 which normally acts on collar 66 under the force of fluid admitted by port 72 to hold the collar 66 resiliently in an advance position against the force of compression spring 67. Piston rod 68 of piston 69 is extended on the side remote from collar 66 and slides in cylinder 74. Casing 74 containing limit switches 77 and 77' which control the stroke of piston 69 is affixed to cylinder 74. A detailed description and showing of such a piston are found in U.S. Pat. application Ser. No. 748,402, filed July 29, 1968 and assigned to the same assignee as the instant invention.

Each toolholder 19 has a tapered spigot 85 for mating in conical recess 20 defined at the front end of spindle 23. Within recess 20, stem 64 terminates in the form of pin 78 of reduced diameter defining radial recesses 79 on its exterior surface (FIGS. 2 and 5). Pin 78 is inserted in bushing 81, the wall of the latter defines seating openings 82, each housing within it a small ball 83. The bushing is provided with slots 122 and 122' into which fits lug 123 which is fixed to stem 64. Compression spring 84 is interposed between a shoulder of bushing 81 and stem 64 and normally holds bushing 81 against ring 126 which is screwed to spindle 23. Balls 83 are thereby received in recesses 79 for housing in their corresponding seats 82. When bushing 81 is advanced against pin 78, balls 83 are cammed out of their corresponding recesses and project from seats 82 into bushing 81 to engage corresponding recesses 86 on the interior surface of bore 87 in spigot 85 of toolholder 19.

The elements designated 88–91, and 93 comprise mounting means to secure toolholders 19 to drum 17. Tool carrier 19 is thus provided with collar 88 in which are formed grooves 89 and 89' in diametrically opposite positions (FIG. 5). Grooves 89 and 89' cooperate with bars 91 and 91' (FIG. 5) each provided with a recess 92 and 92' corresponding to one of grooves 89 and 89'. Bars 91 are rotatable about their vertical axes and, when positioned as in FIG. 2, lock collar 88 against rotation, but when both are rotated through 180° they allow the collar to rotate because the recesses then face the tool holder 19 to be removed from the seat S of the drum 17 upon being engaged by the spindle 23. Each bar 91 is held in position on the drum 17 by a spring loaded detent ball 93 (FIG. 1) which engages in one of a pair of notches 90 formed in each bar 91. These features are clearly shown in U.S. Pat. application Ser. No. 748,402 and 748,535, both filed July 29, 1968 and assigned to the same assignee as the instant invention.

The operation of the machine is as follows:

Drum 17 is rotated for tool selection by turning shaft 32 and worm 31 therewith. This drives worm wheel 29, sleeve 26 and hence drum 17 (FIG. 2) so as to line up the desired tool with spindle 23. Selection of the desired tool is effected by an order that may be programmed on a punched or magnetic tape, for example. Such program means are conventionally known and have therefore not been shown.

To be able to connect a new one of the plurality of tools to spindle 23, the latter must be correctly oriented so that radial keys 46, 46' accurately enter corresponding slots 47, 47' of toolholder 19 (FIG. 5) Aligning of spindle 23 for this purpose is effected (FIGS. 3 and 4) by admitting pressure fluid by means of an electrically controlled valve through duct 141 of piston 48 to cylinder 49. The latter is thereby advanced causing helical cam 52 to engage roller 53. Should the latter bear on the edge of cam 52, pin 54 would be forced to travel down the helical slot in shaft 57 thereby compressing spring 63. This action ceases after a small helical displacement of roller 53 which then snaps into cam 52 and is reset by spring 63 to its original position relative to shaft 57. Cam 52 then acts on roller 53, carrying it into terminal seating 55 (FIG. 4) and causing rotation of grooved shaft 33 by sleeve 56, shaft 57 and terminal shoulder 58. This in turn causes rotation, via gear train 35, 36, 37, of spindle 23 and places it in the required angular position (FIG. 2).

At this point motor 50 (FIG. 1) starts and rotates shaft 45 (FIG. 3) and thereby screw 41. The latter's associated nut 42 pulls slide 39 forward (FIG. 2) together with support 30 and gears 35, 36, 37 (FIG. 3) so as to cause spindle 23 to mate with the selected new toolholder 19.

Under the control of fluid admitted through port 72 (FIG. 6), piston 69 follows chuck 23 and holds rod 64 in the position, relative to the chuck, shown in FIG. 4. Fluid then enters cylinder 71 (FIG. 3) through port 73 and causes piston 69 to perform a complete rearward stroke. This action frees head 66 of stem 64 and allows it to be pushed to the rear by spring 67. In retracting, stem 64 displaces lug 123 (FIG. 5) from slots 122, 122' whereby pin 78 withdraws recesses 79 from balls 83. The latter are thus forced radially outward to engage in recesses 86 of bore 87, thereby locking toolholder 19 to spindle 23. The toolholder is then disconnected from drum 17 by rotating the bars 91 and 92 as above-stated details of the operation and structure of this function are also found in a copending application Ser. No. 748,402 and 748,535, referenced hereinabove.

Motor 34 (FIG. 1) is then actuated and, acting via gear wheel 25 (FIG. 3), rotates splined shaft 33. The latter acts through gears 35, 36, 37 to rotate spindle 23 together with toolholder 19. At the same time, motor 50 rotates screw 41 at a rate corresponding to the desired tool feed whereby the tool executes the work operation required.

Since the advance of spindle 23 is followed alike by slide 39 and gears 35, 36, 37, it is evident that splined shaft 33 drives the spindle from a point which maintains a constant position relative thereto, thereby preventing torsional distortions that might develop were shaft 33 in axial alignment with the spindle.

When the work operation is completed, the rotation of motor 50 is reversed so as to withdraw spindle 23 until the toolholder 19 is returned to the drum and locked upon it in a predetermined rotational setting in known manner. Force is then exerted upon collar 66 of stem 64 which is still in an advanced position together with spindle 23, as a result of which stem 64 is moved forward within spindle 23 by a small amount with respect to bushing 81. Lug 123 on stem 64 then pushes bushing 81 forward against ring 126. During this movement, terminal pin 78 of stem 64 realigns recesses 79 with balls 83 so that the latter are enable to reenter radially.

By again turning screw 41, slide 39 is withdrawn to the rear, thereby moving spindle 23 and stem 64 clear of toolholder 19. Thereby the machine reassumes its original position and is ready to select a new tool. Cylinder 49 is, of course, retracted after it has served its purpose by admitting pressure fluid through port 140.

It is therefore clear that devices 52 and 53 are capable of lining up spindle 23 from whatever position it may be in to a predetermined angular position in order to allow insertion of a selected one of toolholders 19 into spindle 23, and that securement of the selected toolholder to spindle 23 is effected by coupling elements 64, 83, and 86 consisting of translational locking devices inside the spindle.

What is claimed is:

1. A machine tool arrangement having a plurality of tools and a device having means for rapid selection and application of individual tools to a workpiece according to a predetermined sequence comprising:

a rotatable spindle, an individual toolholder associated with each tool in said plurality of tools for mounting the said tool, alignment means operative to align the spindle in a predetermined angular setting with respect to the toolholder of each corresponding tool as the latter is selected for operation on the workpiece according to the predetermined sequence, to provide engagement between the corresponding toolholder and spindle, locking means associated with the spindle to couple said spindle to the toolholder when aligned therewith, and drive means to cause the spindle to drive the selected tool when its corresponding toolholder is coupled to the spindle, said alignment means comprising an actuator operative to advance and retract a cam and a cam follower, the said cam follower being coupled to the spindle and operative in response to engagement with the cam when it is advanced to rotate the spindle to the predetermined angular setting,
said actuator comprising a double-acting pressure fluid actuator and the cam comprises a double helical cam.

2. The machine tool arrangement recited in claim 1 wherein the locking means comprise key means fixed to the spindle to mate with corresponding key receptacle means defined by the toolholder when the spindle is in the predetermined angular setting.